US008661446B2

(12) United States Patent
Conrad et al.

(10) Patent No.: US 8,661,446 B2
(45) Date of Patent: Feb. 25, 2014

(54) METHODS AND APPARATUS FOR MANAGING AND CONTROLLING POWER CONSUMPTION AND HEAT GENERATION IN COMPUTER SYSTEMS

(75) Inventors: Mark Steven Conrad, San Diego, CA (US); Robert A. Hillman, San Diego, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 126 days.

(21) Appl. No.: 13/150,948

(22) Filed: Jun. 1, 2011

(65) Prior Publication Data
US 2011/0231684 A1 Sep. 22, 2011

Related U.S. Application Data

(62) Division of application No. 11/399,001, filed on Apr. 5, 2006, now Pat. No. 8,032,889.

(51) Int. Cl.
*G06F 9/46* (2006.01)
(52) U.S. Cl.
USPC .............................. 718/103; 718/104; 718/107
(58) Field of Classification Search
None
See application file for complete search history.

(56) References Cited

U.S. PATENT DOCUMENTS

| | | | |
|---|---|---|---|
| 4,414,624 A | 11/1983 | Summer et al. | |
| 5,189,647 A | 2/1993 | Suzuki et al. | |
| 5,630,148 A | 5/1997 | Norris | |
| 5,956,474 A | 9/1999 | Bissett et al. | |
| 6,751,749 B2 | 6/2004 | Hofstee et al. | |
| 6,834,354 B1 | 12/2004 | Togawa | |
| 6,938,183 B2 | 8/2005 | Bickel | |
| 6,986,068 B2 | 1/2006 | Togawa | |
| 7,310,759 B1 | 12/2007 | Carmichael et al. | |
| 7,515,996 B2 | 4/2009 | Wald | |
| 7,589,558 B1 | 9/2009 | Tseng et al. | |
| 7,797,575 B2 | 9/2010 | Clark et al. | |
| 7,996,714 B2 | 8/2011 | O'Connell et al. | |
| 8,117,512 B2 | 2/2012 | Sorensen et al. | |
| 8,140,893 B2 | 3/2012 | Niino | |
| 2004/0030966 A1 | 2/2004 | Spieker et al. | |
| 2004/0073822 A1 | 4/2004 | Greco et al. | |
| 2004/0193735 A1 | 9/2004 | Peleska et al. | |

(Continued)

OTHER PUBLICATIONS

Notification of Transmittal of the International Search Report and Written Opinion issued in Corresponding International Patent Application No. PCT/US2011/58394 on Mar. 16, 2012.

*Primary Examiner* — Van Nguyen
(74) *Attorney, Agent, or Firm* — Knobbe Martens Olson & Bear LLP

(57) ABSTRACT

A method for reducing power consumption and heat generation in a computer system employs a substitute idle task that puts the processor into a dormant mode, e.g., sleep, nap, or doze mode. The substitute idle task replaces a conventional operating system idle task. The substitute idle task may have a low priority, such as that of the conventional idle task, which it replaces. At each occurrence of a quantum interrupt, a task scheduler schedules applications for execution during the accompanying time slice. After the scheduled applications are done, the substitute idle task is executed. The dormant mode caused by the idle task reduces the system's power consumption. The idle task may also have a high priority and be designed to run for a predetermined percentage of time. As the processor spends the predetermined percentage of time in the dormant mode, known power consumption reduction may be guaranteed in the system.

29 Claims, 6 Drawing Sheets

(56) References Cited

U.S. PATENT DOCUMENTS

| | | |
|---|---|---|
| 2005/0160312 A1 | 7/2005 | Seng et al. |
| 2006/0020850 A1 | 1/2006 | Jardine et al. |
| 2006/0020852 A1 | 1/2006 | Bernick et al. |
| 2006/0150187 A1* | 7/2006 | Vaddagiri .................. 718/102 |
| 2006/0236168 A1 | 10/2006 | Wolfe et al. |
| 2007/0052453 A1 | 3/2007 | Wald |
| 2009/0327818 A1 | 12/2009 | Kogelnik |
| 2011/0208997 A1 | 8/2011 | Czajkowski |

\* cited by examiner

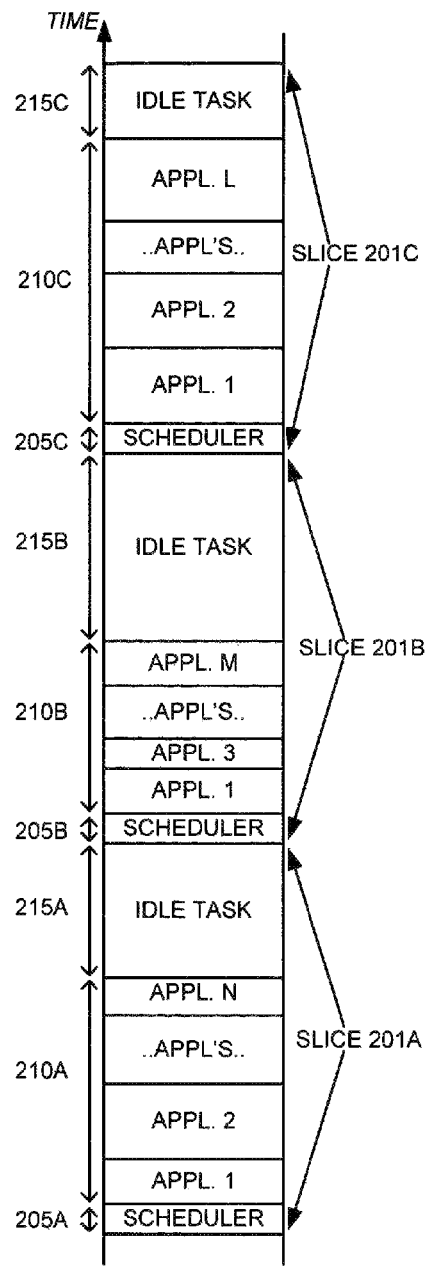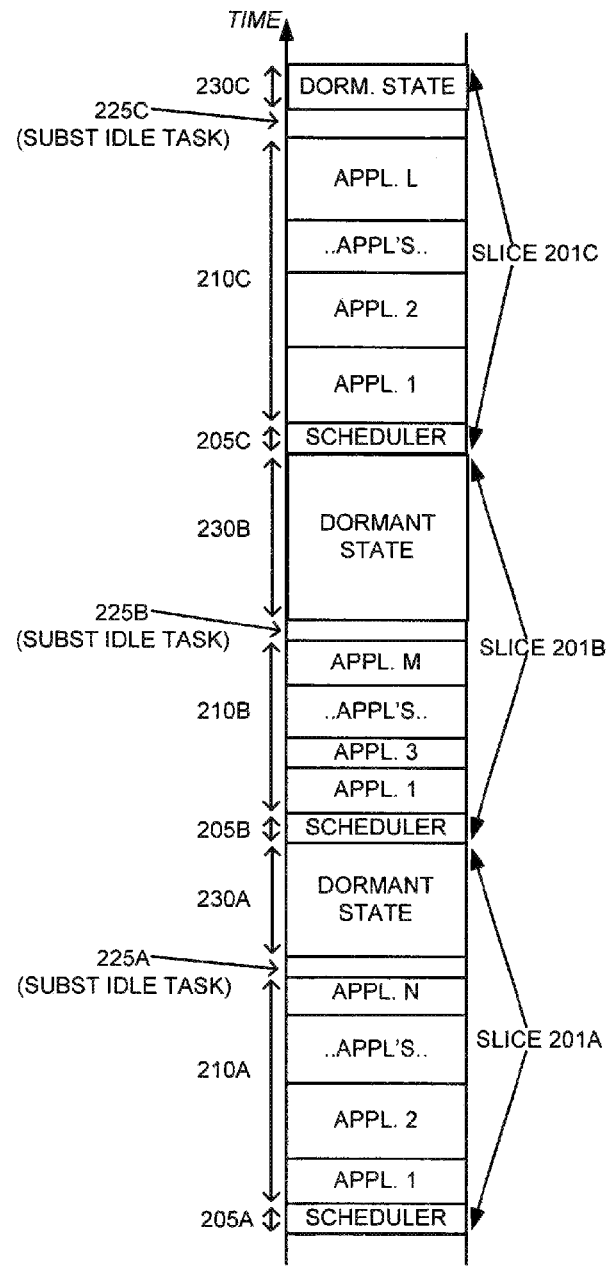
FIG. 2A
(PRIOR ART)
FIG. 2B

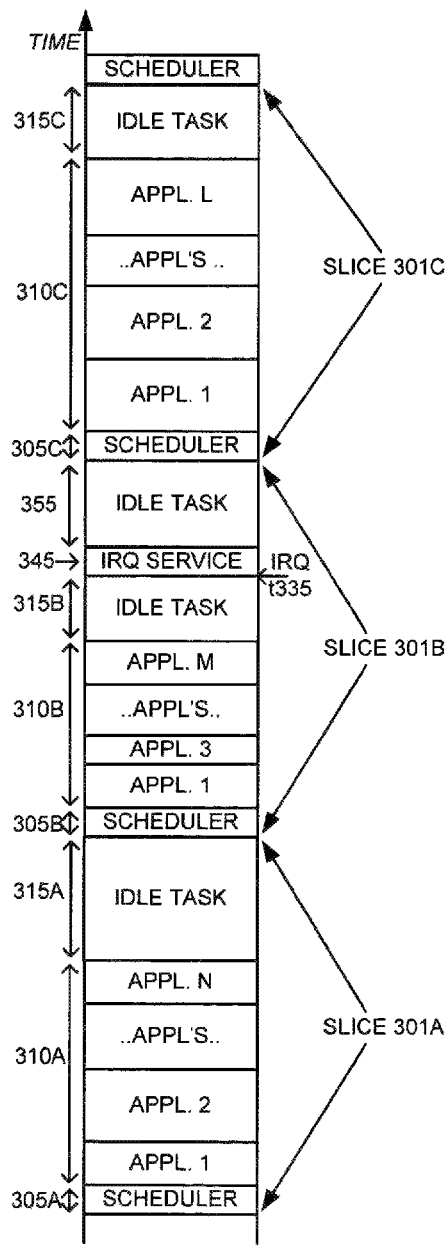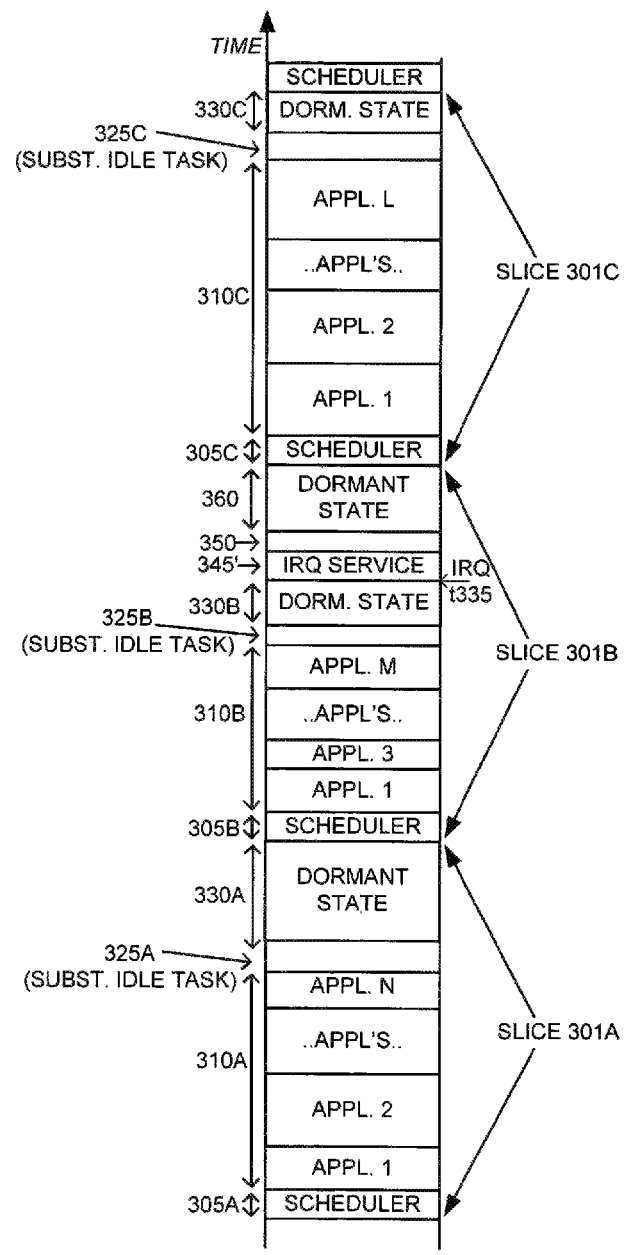
FIG. 3A
(PRIOR ART)
FIG. 3B

METHODS AND APPARATUS FOR MANAGING AND CONTROLLING POWER CONSUMPTION AND HEAT GENERATION IN COMPUTER SYSTEMS

RELATED APPLICATIONS

The present invention is a divisional application of U.S. patent application Ser. No. 11/1399,001 filed Apr. 5, 2006, now U.S. Pat. No. 8,032,889, which is incorporated herein by reference for all purposes.

FIELD OF THE INVENTION

The present invention relates generally to computer systems. More specifically, the present invention relates to methods and apparatus for managing and controlling power consumption and heat generation in computer systems.

BACKGROUND

As semiconductor fabrication technology advances, processor operating frequencies, transistor densities, and computing powers all rise. The gains in density, speed, and computing power of processors are generally accompanied by increases in power consumption. Increased power consumption is objectionable, particularly in portable, mobile, and space applications, because of weight and volume constraints imposed by these applications on power sources. Moreover, power consumption is directly related to heat generation, which is also unwelcome, because the generated heat must somehow be dissipated in order to avoid exceeding specified operating temperature limits and prevent thermal system failures.

Several techniques are known for controlling power consumption in modern processors. Because power consumption at a given operating voltage is often linearly related to the operating frequency of a processor, many processors may be configured to operate at variable clock frequencies, with decreased power consumption at lower frequencies achieved at the cost of decreased computational performance. There is generally a lower limit to the clock frequency of a given processor, below which the processor should not be operated. Thus, decreasing frequency alone may not sufficiently lower power consumption and heat generation.

Moreover, running a processor at a low frequency in a real-time system entails a risk of inadequate processor performance at a critical time. For example, data transfers and other external interactions of a processor can fail if the processor speed is inadequate for the required performance. In some systems, such malfunctions can cause severe adverse consequences, including total mission failures. Such potential consequences can make the use of this power conservation technique inadvisable.

In accordance with another technique, some processors have one or more dormant states in which their power consumption is reduced to one degree or another. The dormant states may include "sleep," "nap," and "doze" states. Generally, the processor is brought out of such a dormant state with an interrupt. Some dormant states are associated with excessive latency, i.e., time or number of clock cycles that it takes to enter and especially exit the state. This is problematic in real-time systems when a response to external stimuli must be timely. Even if a dormant state has a relatively short latency, interrupts are not always predictable, particularly in real-time systems, so that specific power savings generally cannot be guaranteed through the use of a dormant state. For example, an interrupt may occur soon after a processor enters a dormant state, preventing power savings even after the interrupt is serviced.

Some operating systems employ "discretized" timing systems with task schedulers and low priority idle tasks for allocating computational time of a processor. The OS relies on a periodic "quantum" interrupt, typically in the range of 10-16 milliseconds, to run a task scheduler. At each quantum interrupt occurrence, the task scheduler runs and decides whether there are any application tasks that need to run during the associated (immediately following) time slice, and the order in which the tasks should be run according to their respective priorities. The task scheduler then runs the application tasks in the order determined, until they are done. If all the tasks are completed before the next scheduler interrupt, the task scheduler runs a low priority idle task. Because the idle task has low priority, the processor can respond to any interrupts (including non-task scheduler interrupts, for example, interrupts from external stimuli) within a relatively short time period, enabling the system to respond to the stimuli in real time. During the idle task, the processor is active and consequently continues to dissipate substantial power.

Merely causing a processor to enter a dormant state through a conventional user application task (i.e., a non-operating system task) would save some power, but the power savings would last only until the next occurrence of the application scheduler or another interrupt. Furthermore, application tasks may cause the processor not to enter a dormant state for sufficiently long periods, causing the power consumption in the processor to exceed the total power budget allocated to the processor.

SUMMARY

A need thus exists for decreasing processor power consumption and concomitant heat generation in computer systems. Another need exists for decreasing processor power consumption while maintaining low-latency response to interrupts. Still another need exists for limiting total processor power consumption in computer systems. A further need exists for decreasing processor power consumption in multi-processor self-correcting computer systems.

Various embodiments of the present invention are directed to computer systems, methods of operating processors and computer systems, and machine-readable articles of manufacture embodying instructions for operating processors and computer systems. In an embodiment of a method of operating a processor, a task scheduler is executed in the beginning of each periodic time slice interval of a plurality of contiguous time slice intervals to obtain a determination of scheduled applications and a schedule of application execution during each periodic time slice interval. (Contiguous here means that the plurality of time slice intervals constitutes a continuous time period.) The scheduled applications are executed in each periodic time slice interval in accordance with the determination of applications and the schedule of application execution for each periodic time slice interval. A substitute idle task is executed upon completion of executing the scheduled applications in each periodic time slice interval. The step of executing the substitute idle task includes causing the processor to enter a dormant state.

In one aspect of the invention, the substitute idle task is a low priority task, for example, the lowest priority task.

In one aspect of the invention, the dormant state is a low latency period dormant state. For example, the low latency period dormant state requires fewer than fifty processor clock cycles to awaken the processor. As another example, the low latency period dormant state requires fewer than twenty processor clock cycles to awaken the processor. By way of another example, the low latency period dormant state requires no more than ten processor clock cycles to awaken the processor.

In one aspect of the invention, the method also includes receiving a first non-operating system interrupt during the dormant state caused by the substitute idle task, and servicing the first non-operating system interrupt during the time slice in which the first non-operating system interrupt is received. The first non-operating system interrupt may be generated by a stimulus event external to the computer system of the processor, or by an event internal to the computer system. The method may also include executing the substitute idle task in response to completion of servicing the first non-operating system interrupt during the time slice in which the first non-operating system interrupt is received. Additionally, the method may include receiving a second non-operating system interrupt during the dormant state caused by the substitute idle task executed in response to completion of servicing the first non-operating system interrupt, and servicing the second non-operating system interrupt during the time slice in which the second non-operating system interrupt is received.

In an embodiment, a method of operating a computer system with a processor is provided. The method includes providing a discretized operating system for controlling applications executed by the computer system, and replacing an idle task of the discretized operating system with a substitute idle task that causes the processor to enter a dormant state. The substitute idle task may have the same priority as the idle task it replaces.

In one aspect of the invention, the dormant state is a nap state.

In one aspect of the invention, the dormant state is a low latency period dormant state, for example, a dormant state that requires fewer than fifty, fewer than twenty, or no more than ten processor clock cycles to awaken the processor.

In an embodiment, a method of operating a processor includes a step of executing a task scheduler in beginning of each periodic time slice interval of a plurality of time slice intervals to obtain a determination of scheduled applications and a schedule of application execution during each periodic time slice interval. The schedule of application execution during each periodic time slice interval is such that the applications are arranged in accordance with their priority levels, and the plurality of time slice intervals make up a continuous time period. A substitute idle task is included among the applications scheduled for each periodic time slice interval. The substitute idle task is configured to cause the processor to enter a dormant state, and has an idle task priority level lower than each other scheduled application so that it is scheduled last during each periodic time slice interval. The method also includes a step of executing the scheduled applications in each periodic time slice interval in accordance with the determination of applications and the schedule of application execution during each periodic time slice interval.

In one aspect of the invention, the substitute idle task is configured to cause the processor to enter a low latency period dormant state that, for example, requires fewer than fifty, fewer than twenty, or no more than ten processor clock cycles to awaken the processor.

In one aspect of the invention, the method also includes a step of receiving a first non-operating system interrupt during the dormant state caused by the substitute idle task, and servicing the first non-operating system interrupt during the time slice interval in which the first non-operating system interrupt is received. The method may further include a step of executing the substitute idle task in response to completion of servicing the first non-operating system interrupt during the time slice interval in which the first non-operating system interrupt is received.

In an embodiment, a method of operating a computer system with a processor is provided. The method includes providing a discretized operating system for controlling applications executed by the computer system, and replacing an idle task of the discretized operating system with a highest priority substitute idle task that causes the processor to enter a dormant state.

In embodiments, a computer system includes a processor and a memory storing program code. The program code includes instructions for causing the processor to perform the steps of the methods described above.

In embodiments, an article of manufacture stores machine-readable program code. The program code includes instructions that, when executed by a processor of a computer system, causes the processor to perform the steps of the methods described above.

These and other features and aspects of the present invention will be better understood with reference to the following description, drawings, and appended claims.

BRIEF DESCRIPTION OF THE FIGURES

FIG. 2A shows exemplary time periods of processor operation in a conventional discretized operating system;

FIG. 2B shows exemplary time periods of processor operation in a modified discretized operating system using a low priority substitute idle task, in accordance with some aspects of the present invention;

FIG. 3A shows exemplary time periods of processor operation in a conventional discretized operating system, with an interrupt occurring during the operating system's idle task;

FIG. 3B shows exemplary time periods of processor operation in the modified discretized operating system using a low priority substitute idle task, with an interrupt occurring during the operating system's substitute idle task, in accordance with some aspects of the present invention;

DETAILED DESCRIPTION

Figure 1:
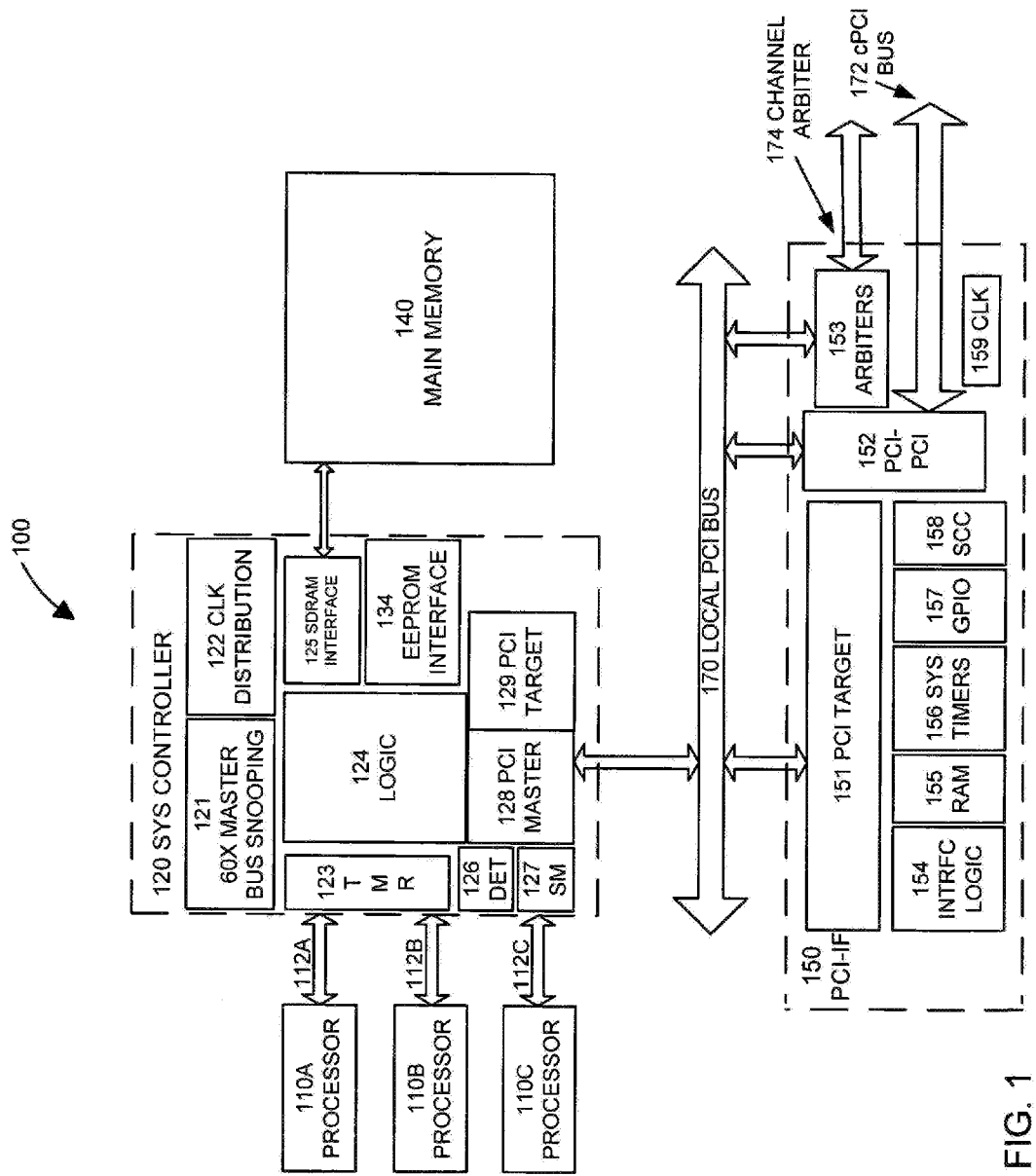
FIG. 1 shows selected components of a self-correcting computer configured to achieve power savings through the use of a substitute idle task, in accordance with some aspects of the present invention.

In this document, the words "embodiment" and "variant" refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity. Characterization of an embodiment as "exemplary" means that the embodiment is used as an example. Such characterization does not necessarily mean that the embodiment is a preferred embodiment; the embodiment may but need not be a currently preferred embodiment.

The words "couple," "connect," and similar expressions with their inflectional morphemes do not necessarily import an immediate or direct connection, but include connections through mediate elements within their meaning.

Expressions "quantum interrupt," "time slice interrupt," and "operating system time slice interrupt" refers to a periodic interrupt caused by an operating system for the purpose of scheduling applications/tasks for execution during the immediately following period between two adjacent time slice interrupts. The period between two consecutive time slice interrupts may be referred to as an "operating system time slice," "time slice interval," "time slice," "slice," or a similar designation. The code that determines which applications are scheduled to run, and the order in which they are scheduled to run during each time slice may be referred to as a "task scheduler" or "application scheduler." An operating system using such time slice interrupts and periodic scheduling may be referred to as a "discretized operating system," an "operating system with discretized timing," or a similar designation.

A "dormant state" or "dormant mode" of a processor is a state in which the processor is deactivated at least partially in order to reduce substantially its power consumption. In such an energy-saving mode of operation, processor components unnecessary for many functions are shut down, but the internal state of the processor (internally stored data of the processor, such as counters, registers, and memory elements) and state of the associated computer system are preserved. Thus, the computer system need not boot-up to resume operations, but can be awakened in a relatively short time, as compared to the time needed for booting. Examples of dormant modes are "sleep," "nap," and "doze" states of PowerPC® processors.

A processor's "power consumption state" is a combination of the operating clock frequency and voltage settings of the processor.

A "schedule of application execution" refers to the order in which scheduled applications are executed, at least in the absence of intervening events such as interrupts. Generally, applications are scheduled to be executed in accordance with the priorities assigned to the applications, i.e., higher priority applications being executed before lower priority applications.

A "low latency dormant state period" or "low latency dormant mode period" refers to a dormant state from which the processor can be awakened to service in real-time each interrupt expected in the computer system that includes the processor, for example, within the time required by the interrupts in accordance with system performance requirements.

The words "application" and "task" designate a sequence of processor instructions for performing a specific function.

Other and further definitions (both explicit and implicit) and clarifications of definitions may be found throughout this document. All the definitions are intended to assist in understanding this disclosure and the appended claims, but the scope and spirit of the invention should not be construed as strictly limited to the definitions, or to the particular examples described in this specification.

Reference will now be made in detail to several embodiments of the invention that are illustrated in the accompanying drawings. Same reference numerals may be used in the drawings and the description to refer to the same components or steps. The drawings are in simplified form and not to precise scale. For purposes of convenience and clarity only, directional terms, such as top, bottom, left, right, up, down, over, above, below, beneath, rear, and front may be used with respect to the accompanying drawings. These and similar directional terms should not be construed to limit the scope of the invention.

Referring more particularly to the drawings, FIG. 1 illustrates a self-correcting computer system 100 capable of tolerating single event upsets and other processor faults. The operation of this system is described in a commonly-assigned U.S. patent application Ser. No. 11/356,945 entitled CACHE COHERENCY DURING RESYNCHRONIZATION OF SELF-CORRECTING COMPUTER, filed on Feb. 16, 2006. A similar system is described in a commonly-assigned U.S. patent application Ser. No. 10/418,713, entitled SELF-CORRECTING COMPUTER. Each of these applications is hereby incorporated by reference in its entirety, including all tables, figures, claims.

The methods for reducing power consumption and heat generation described in the present document can be implemented and practiced in the system 100. It should be noted, however, that self-correcting capability and redundancies of the system 100 are not required by the invention. Similarly, many other features of the system 100 are also not required by the invention. For example, the invention may be implemented in a simple single-processor computer system.

The system 100 includes three processors 110A, 110B, and 110C coupled to a system controller chip module 120. The three processors 110 operate synchronously in parallel and are coupled to the system controller module 120 via separate processor buses 112, as shown in the Figure. The system 100 further includes a main memory module 140 and a PCI-IF chip module 150, which is coupled to the system controller module 120 via a local PCI bus 170.

Each processor 110 can be implemented as a single chip unit or as a combination of components, for example, as a chip set. In some variants, each processor 110 is a PowerPC® ("PPC") processor made by International Business Machines Corporation of Armonk, N.Y. The invention, however, can work with a multitude of other processors.

The main memory module 140 may include one or more synchronous dynamic random access memory (SDRAM) chips, static random access memory (SRAM) chips, programmable read only memory (PROM) chips, electrically erasable programmable read only memory (EEPROM) chips, and/or other memory devices. In one exemplary variant, the main memory 140 includes (1) three SDRAM 72SD3232 one Gigabit chips protected by error correction coding (ECC), (2) a 32Kx8 UT28F256 PROM chip protected by error correction coding, and (3) a 2 Megabit 79LV2040 EEPROM chip, which is also protected by error correction coding. Error correction coding, for example, parallel Reed-Solomon coding, provides memory fault tolerance in the computer system 100. The SDRAM chips can be employed, for example, as a scratch pad memory and to store instructions executed by the processors 110, as well as other data. Other main memory configurations and other memory devices also fall within the scope of the present invention.

As illustrated in FIG. 1, the PCI-IF module 150 is coupled to the system controller 120 via the local PCI bus 170. The module 150 includes a PCI target 151, 1553 interface logic 154, 1553 random access memory (RAM) 155, system timers 156, general purpose I/O (GPIO) controller 157, synchronous/asynchronous serial communications controller (SCC) 158, PCI-PCI bridge 152, arbiters 153, and clock distribution circuit 159.

In the illustrated embodiment, the system controller module 120 includes various logic components 124, such as memory controllers, interrupt handlers, direct memory access (DMA) modules, universal asynchronous receiver/transmitter (UART), watchdog timer, and mission timer. The system controller module 120 also includes a PCI master 128, PCI target 129, SDRAM interface 125, EEPROM interface 134, triple module redundancy (TMR) logic 123, processor correlation detector module 126, and resynchronization state machine 127. The functions of the TMR logic 123, processor correlation detector module 126, and resynchronization state machine 127 will be discussed in more detail below.

The processors 110 operate synchronously in parallel. The TMR logic 123, which is coupled to each of the processors 110 via the processor buses 112, transmits synchronous signals between each of the processors 110 and the rest of the computer system 100. The processors 110 thus operate in complete synchronization with each other, at least until a fault event. The TMR logic 123 includes voting logic circuitry that examines each valid and relevant signal from each of the processors 110 and generates majority "votes" of the corresponding outputs of the three processors. The voting logic circuitry of the TMR logic 123 votes the relevant signal and operates on the assumption that the majority vote is correct and a fault occurred in the processor with the signal that differs from the majority vote value. For example, if the particular output of the processor 110A is at a logic 0 level while the corresponding outputs of the processors 110B and 110C are at a logic 1 level, the majority vote logic circuitry assumes that a fault occurred in the processor 110A. As a natural effect of majority voting, the TMR logic 123 isolates the faulty processor 110A, and continues to transmit signals between the non-faulty processors 110B/C and the rest of the computer system 100. Thus, multiplexing is not required to isolate the faulty processor from the system.

Since the processors 110 are connected to most of the components of the system 100 through the TMR logic 123, these components are isolated from the processors 110 and see only the majority vote for each processor signal. Consequently, these components are not affected by the single event upset of the processor 110A and continue to function normally. In this way, the computer system 100 can continue to operate following a fault in the processor 110A (or in another processor).

To restore fault tolerance after a single event upset in one of the processors 110, the system 100 can synchronize the processor in which the single event upset occurred with the other processors. In case of a fault (single event upset) in the processor 110A, the system 100 suspends operation of the processor 110 (e.g., holds the processor 110A in reset), and isolates this processor from the other components of the system 100, so that the fault in the processor 110A will not cause additional faults or errors in the system 100. The computer system may log the fault in the main memory 140 or elsewhere, for example, recording information that identifies the time of the event, the faulty processor, and the signal or signals on which the fault was detected. Then, the computer system 100 flushes out the data describing the internal processor state of the processors 110B and 110C, and, optionally, of the processor 110A in which the fault occurred.

The processor internal state data is data describing the state of internal elements of the processors that can change their state, including counters, registers, and memory elements. Thus, not all of the data may be flushed out of the processors; some data may be recreated, some data may be irrelevant. The state data flushed from the processors 110B and 110C is sufficient to restore these or other identical processors (e.g., the upset processor 110A) to the state that is identical or similar to the state in which the processors 110B and 110C were at the time when the state data were flushed out. As will become clear from the following paragraphs, processor state data in this context may but need not include internal processor cache data.

In some embodiments, the processor state data is flushed from all of the processors, and a majority vote is taken for each data unit, for example, each bit of the flushed data. A single instance of the flushed data in accordance with the majority vote is stored for future use in synchronizing the processors 110. In other words, each data unit of the stored data instance is the same as the majority of corresponding data units of all the processors 110.

After the processor state data is flushed and the single instance of the flushed data in accordance with the majority vote is stored, the processors 110B and 110C are also reset. All the processors 110 are now in a reset state. The processors 110 are then taken out of the reset state and initialized. Processor initialization may include, for example, initialization of the memory management unit (MMU) of the processor. After initialization, the stored state data is reloaded into each processor 110, including the processor 110A. The three processors 110 are thus once again in synchronization (lockstep) with each other. The processors are then allowed to continue running and performing the tasks of the application or applications for which the system 100 is used.

In accordance with an embodiment of the present invention, a computer system, such as the system 100, operates using a modified real-time operating system with discretized timing, for example, the VxWorks® operating system of Wind River Systems, Inc., of Alameda, Calif. As has already been mentioned, discretized operating systems employ a periodic quantum interrupt to run a task scheduler. The task scheduler runs at each interrupt to decide whether there are any applications that need to run during the immediately following time slice, and the order in which the applications should be run according to the applications' priorities. The task scheduler then runs the applications in the order determined, until they are done. If all the applications are completed before the next quantum interrupt, the task scheduler runs an idle task.

In an embodiment, the idle task of such an operating system is replaced with a substitute idle task, which is a low priority task that always asks for processor time and then puts the processor in the dormant state. The substitute idle task may be scheduled and executed by the task scheduler in the same manner as the other applications, or it may be scheduled separately. FIGS. 2A and 2B depict transition of the computer system with discretized timing from conventional scheduling (FIG. 2A) to the scheduling using the new substitute idle task (FIG. 2B). These two Figures show the same system executing the same hypothetical applications under a conventional and modified operating systems.

FIG. 2A shows execution of tasks during consecutive time slices 201A-201C under a conventional discretized operating system. In the beginning of each time slice, a scheduler schedules applications for the respective time slice 201A, 201B, or 201C. In the time slice 201A, the scheduler operates during time period 205A to schedule applications 1, 2 . . . N for this time slice; in the time slice 201B, the scheduler operates during time period 205B to schedule applications 1, 3 . . . M; and in the time slice 201C, the scheduler operates during time period 205C to schedule applications 1, 2 . . . L. The scheduled applications then execute during the respective time slices: in the time slice 201A the scheduled applications execute during time period 210A, in time slice 201B the scheduled applications execute during time period 210B, and in time slice 201C the scheduled applications execute during time period 210C. Note that the applications scheduled for a particular time slice take less than the entire period of the particular time slice to be processed. Consequently, a low priority idle task that always asks for processor time is invoked and executes during time periods 215A, 215B, and 215C. During the periods 215, the processor can accept an interrupt and execute application(s) associated with this interrupt. But whether or not an interrupt is received during execution of the idle task, power is dissipated in the processor in accordance with the power state of the processor (i.e., frequency and voltage settings).

FIG. 2B shows execution of the same applications as in FIG. 2A, but under a modified operating system. As discussed above, in this modified operating system the idle task is replaced by a substitute idle task. The substitute idle task is a low priority task, for example, the lowest or second lowest priority task, or a task with the same priority as the conventional idle task that it replaces. The low priority substitute idle task always asks for processor time, and invokes a dormant state of the processor. In some embodiments, the invoked dormant state is a low latency period dormant mode, for example, a dormant mode with fewer than 50 clock cycles required to awaken the processor to service an interrupt. In some embodiments, the dormant state is such that the latency period is less than 20 clock cycles. In still other embodiments, the latency period is no more than 10 clock cycles. The dormant state may be a nap state, such as the nap state of the PowerPC® processors.

The nap state of the PowerPC® processors has an additional advantage in that the synchronous operation of the processors may be assured upon awakening from the nap state. In other words, processor state and latency are generally the same for all processors of the same make and model independent of the particular processor device used. Thus, in the system 100 the dormant state that the processors 110 enter through the low priority substitute idle task is the nap state. The nap state of the PowerPC® is also characterized by low latency and low level power consumption, which is not substantially higher than the PowerPC® power consumption in the sleep state.

It also appears possible that likelihood of occurrence of processor radiation upset events may be reduced when the processor is in a nap state, as compared, for example, to the processor looping while waiting for an interrupt, timer, or another event.

As shown in FIG. 2B, a scheduler schedules applications for the respective time slice 201A, 201B, or 201C at the beginning of each time slice. In the time slice 201A, the scheduler operates during time period 205A to schedule applications 1, 2 . . . N for this time slice; in the time slice 201B, the scheduler operates during time period 205B to schedule applications 1, 3 . . . M; and in the time slice 201C, the scheduler operates during time period 205C to schedule applications 1, 2 . . . L. The scheduled applications then execute during the respective time slices: in the time slice 201A the scheduled applications execute during time period 210A, in time slice 201B the scheduled applications execute during time period 210B, and in time slice 201C the scheduled applications execute during time period 210C. This is similar or identical to the events shown in the FIG. 2A. Instead of an idle task, however, a low priority substitute idle task executes upon completion of the tasks scheduled for a time slice when execution time remains in the time slice. Thus, the substitute idle task executes during time periods 225A, 225B, and 225C. The substitute idle task puts the processor into a dormant state, as discussed above. The processor remains in the dormant state during time periods 230A, 230B, and 230C of the respective time slices 201A, 201B, and 201C. Power consumption and heat generation are consequently reduced during the time periods 230, relative to the parallel time periods in the diagram of the FIG. 2A.

Note that during the dormant state caused by the low priority substitute idle task the processor remains capable of responding to interrupts in real time, particularly if the dormant state is a low latency period dormant state, as discussed above. FIGS. 3A and 3B depict transition of the computer system with discretized timing from conventional scheduling (FIG. 3A) to the scheduling using the new substitute idle task (FIG. 3B), when an interrupt occurs during idle time, i.e., time that is not used for executing an application.

Three consecutive time slices 301A, 301B, and 301C are shown in FIG. 3A. In the beginning of each time slice, a scheduler schedules applications for the respective time slice 301. In the time slice 301A, the scheduler operates during time period 305A to schedule applications 1, 2 . . . N for this time slice; in the time slice 301B, the scheduler operates during time period 305B to schedule applications 1, 3 . . . M; and in the time slice 301C, the scheduler operates during time period 305C to schedule applications 1, 2 . . . L. The scheduled applications then execute during the respective time slices: in the time slice 301A the scheduled applications execute during time period 310A, in time slice 301B the scheduled applications execute during time period 310B, and in time slice 301C the scheduled applications execute during time period 310C. A low priority idle task is invoked and executes following completion of all tasks in a particular time slice, until the following time slice or occurrence of an interrupt. Thus, the idle task executes during time periods 315A, 315B, and 315C. As depicted in FIG. 3A, the processor executes the idle task in the time period 315A of the time slice 301A until the onset of the following time slice 301B. Similarly, the processor executes the idle task in the time period 315C of the time slice 301C until the beginning of the time slice that follows the time slice 301C. During execution of the idle task in the time period 315B of the time slice 301B, an interrupt occurs, at a time 335. Following the interrupt at the time 335, the processor executes an interrupt service application, during a time period 345. Here, the processor completes the interrupt service application before the next time slice, which is the time slice 301C. The processor then executes the idle task through the remaining portion 355 of the time slice 301B. Once again, power is dissipated in the processor during the execution of the idle tasks in accordance with the power state of the processor (i.e., frequency and voltage settings).

FIG. 3B shows execution of the same applications as in FIG. 3A, but under the modified operating system in which the idle task is replaced by the low priority substitute idle task. As shown in FIG. 3B, a scheduler schedules applications for the respective time slice 301A, 301B, or 301C at the beginning of each time slice. In the time slice 301A, the scheduler operates during time period 305A to schedule applications 1, 2 . . . N for this time slice; in the time slice 301B, the scheduler operates during time period 305B to schedule applications 1, 3 . . . M; and in the time slice 301C, the scheduler operates during time period 305C to schedule applications 1, 2 . . . L. The scheduled applications then execute during the respective time slices: in the time slice 301A the scheduled applications execute during time period 310A, in the time slice 301B the scheduled applications execute during time period 310B, and in the time slice 301C the scheduled applications execute during time period 310C. This is similar or identical to what is shown in FIG. 3A, but with the low priority substitute idle task (rather than the idle task) executing upon completion of the tasks scheduled for a time slice when execution time remains in the time slice. Thus, the substitute idle task executes during time periods 325A, 325B, and 325C. As has already been discussed, the substitute idle task puts the processor into a dormant state, for example, a low latency dormant state. The processor then stays in the dormant state during time periods 330A, 330B, and 330C of the respective time slices 301A, 301B, and 301C, reducing power consumption and heat generation of the computer system.

The dormant state time periods 330A and 330C last until the immediately following time slice and the corresponding execution of the scheduler application. The dormant state time period 330B lasts until the interrupt at the time 335 is received. Following the interrupt at the time 335, the processor executes an interrupt service application, during a time period 345'. As in the case shown in FIG. 3A, the processor completes the interrupt service application before the next time slice 301C. The processor then executes the low priority substitute idle task during a time period 350, and enters the dormant state, remaining in the dormant state during a time period 360. As shown in FIG. 3B, the time period 360 lasts until the execution of the scheduler at the beginning of the next time slice 301C.

As a person skilled in the art should understand after perusal of this document, additional interrupts may awaken the processor from the dormant state during the time period 360. Each additional interrupt may be serviced and, if time remains in the current time slice 301B, the substitute idle process may be executed to put the processor into the dormant state once again. If not enough time remains in the current slice to complete interrupt service, the application servicing the interrupt may be scheduled to continue executing during the following time slice 301C.

Figure 4:
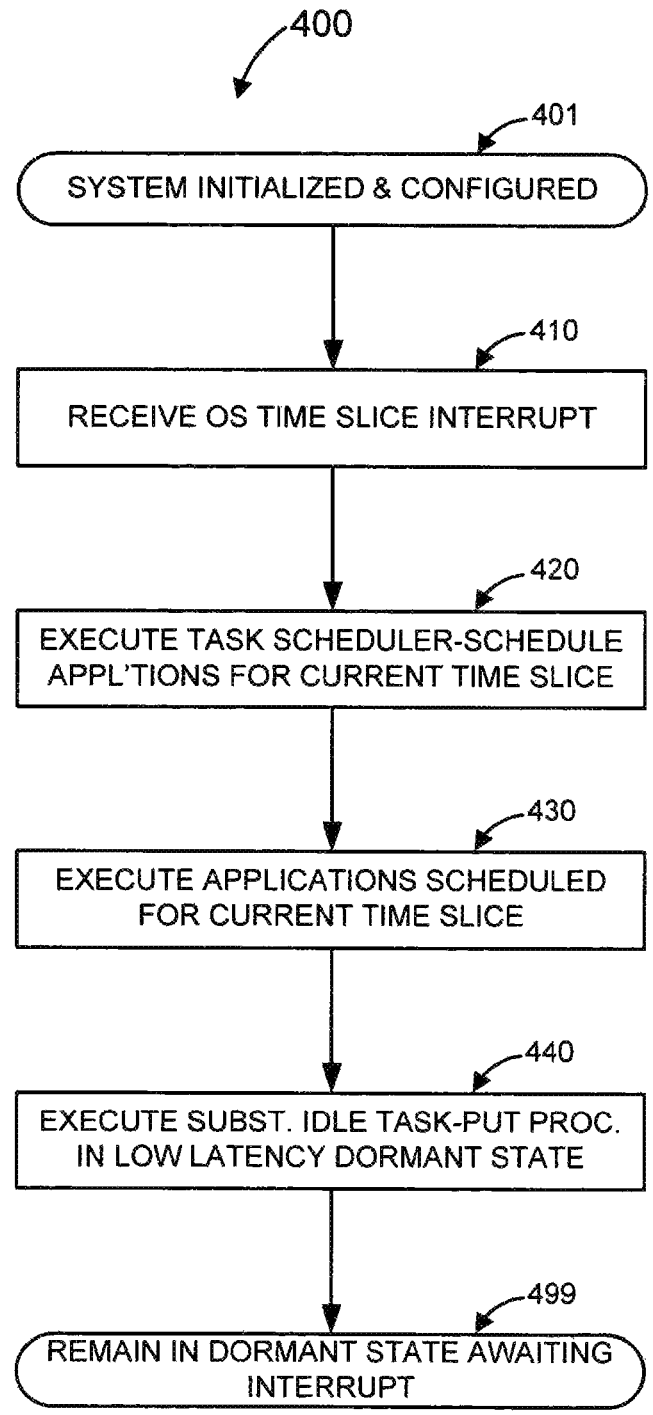
FIGS. 4 and 5 are high-level process flow diagrams illustrating selected steps of methods for reducing power consumption and heat generation through the use of a substitute idle task, in accordance with some aspects of the present invention.
Figure 5:
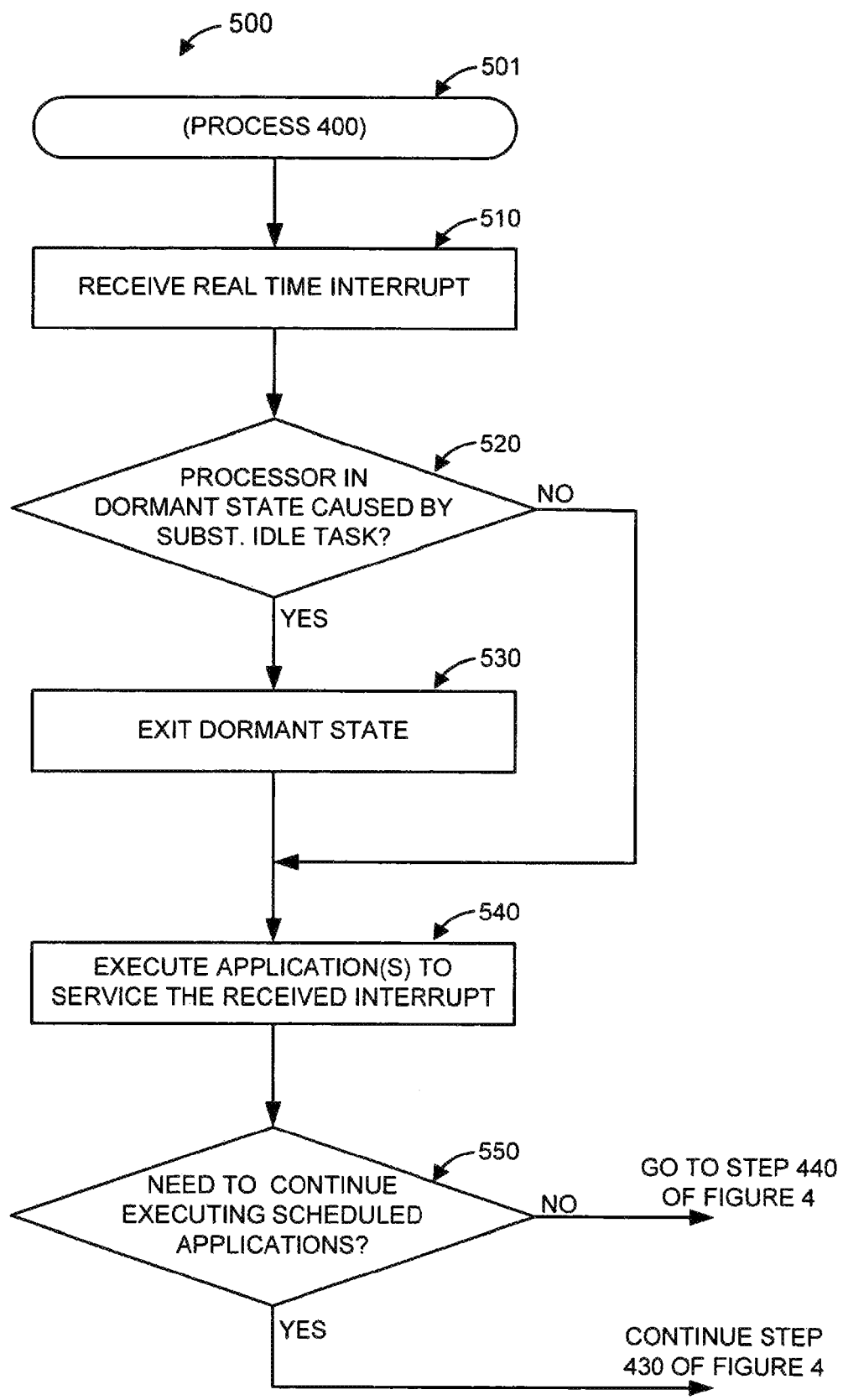

FIGS. 4 and 5 are process flow diagrams illustrating selected steps of methods 400 and 500 for reducing power consumption and heat generation through the use of a substitute idle task. Although certain steps are described serially, some of these steps may be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. Furthermore, not every illustrated step may be required in every embodiment in accordance with the invention, while some steps that have not been specifically illustrated may be desirable or necessary in some embodiments in accordance with the invention. As a person skilled in the art would understand after perusal of this document, the process flow diagrams of FIGS. 4 and 5 are drawn from a very high-level perspective, and are intended to assist in the understanding of the methods discussed, rather than to provide a comprehensive representation of the methods. The methods may be performed by the computer system of FIG. 1, for example.

Turning first to FIG. 4, at flow point 401, the processor (or processors, as the case may be) of the computer system is initialized and configured by program code to operate under control of a discretized operating system. At step 410, the processor receives an operating system time slice interrupt, signaling beginning of a time slice for which application processing needs to be scheduled.

At step 420, a task scheduler is executed. The task scheduler schedules the applications (or application, if any, as the case may be) for the current time slice, which corresponds to the interrupt received in the step 410. The processor may do both: (1) determine the applications to be executed in the current time slice, and (2) determine the order of execution of the applications.

At step 430, the processor executes the applications scheduled for the current time slice in the order previously determined in the step 420.

After all the applications scheduled for the current time slice have been executed in the step 430, a substitute idle task is executed in step 440. This is a low priority task, for example, a task with the same priority as the conventional idle task of the discretized operating system under which the computer system performing the process 400 is functioning. The substitute idle task may have the lowest priority that can be designated for a task (application) in the computer system. The substitute idle task causes the processor to enter a dormant state, for example, a low latency period dormant state, as has been discussed above. From the step 440, process flow proceeds to flow point 499, where the processor remains in the dormant state until it is awakened, for example, by the next operating system time slice interrupt, another event internal to the processor or the computer system such as a timer expiration event, or an interrupt due to an external stimulus.

Turning next to FIG. 5, the process 500 illustrates the system's response to a real time interrupt, such as an interrupt due to an external stimulus or an internal event. At flow point 501 the computer system is at one of the steps or flow points of the process 400. For example, the system may be at the flow point 499, i.e., in the dormant state caused by the low priority substitute idle task. The system may also be, for example, executing the applications, at step 430 of the process 400.

At step 510, the processor of the system receives a real time interrupt.

In decision block 520, a determination is made whether the processor was in the dormant state or not at the time the interrupt was received in the step 510. If the processor was in the dormant state, the processor exits the dormant state, in step 530, and then proceeds to step 540. If the processor was not in the dormant state, the step 520 is skipped. In practice, the decision block 520 and the step 530 may be combined and performed simultaneously, as when the interrupt received in the step 510 wakes up the processor from the dormant state.

At the step 540, the processor services the interrupt received in the step 510, that is, the processor executes application (or applications, as the case may be) that service the interrupt. The processor may service the interrupt by preempting other tasks/applications, or it may schedule an application to service the interrupt after some or all of the other applications scheduled for the current time slice.

Upon completion of interrupt servicing in the step 540, the processor determines in decision block 550 whether a need exists to continue executing the applications scheduled for the current time slice. Such a need may be present if the processor was in the course of executing the scheduled applications (in the step 430 of the process 400) when it received the interrupt in the step 510.

If scheduled applications remain to be completed, as determined in the decision block 550, process flow continues with or returns to the step 430 of the process 400. If there are no scheduled applications that remain to be completed during the current time slice, process flow continues to step 440 of the process 400, executing the low priority substitute idle task, which puts the processor into the dormant state once again.

It should be understood that multiple interrupts may be handled in the same or similar manner as described immediately above in relation to a single interrupt. For example, after one interrupt is serviced and the processor enters the dormant state, another interrupt may be received. This other interrupt may then be serviced as is illustrated in FIG. 5, i.e., by exiting the dormant mode (if needed), executing interrupt service application(s), and then executing the low priority substitute idle task to return to the dormant mode. By way of another example, one or more additional interrupts may be received while the processor is servicing the first interrupt received. The interrupts may then be serviced in accordance with their respective priorities and/or respective times of occurrence.

In some computer systems, the total processor or system power consumption must be "hard limited," that is, limited regardless of application processing requirements. This may be the case, for example, when the power budget is insufficient to power the processor even at the lowest available processor power consumption state. Thus, the power must be limited even when the computational performance of the processor would fall below certain requirements. To accomplish this goal, a high-priority operating system (OS) level power limiting task replaces or is used in addition to a conventional idle task of a discretized operating system. As in the embodiments discussed above, the OS level power limiting task causes the processor to enter a dormant state. Unlike the previously discussed embodiments where the substitute idle task has a relatively low or even the lowest priority, here the OS level power limiting task has a relatively high priority. For example, the OS level power limiting task here may have the highest priority. The high priority OS level power limiting task is then made to consume a predetermined percentage (portion) of the processing time of the processor at the beginning of each time slice, following the execution of the task scheduler. The high priority OS level power limiting task does not ask for processor time in addition to the predetermined percentage of the time, because, being high priority, it would then prevent other applications from being executed. The processor may use a timer, either internal or external to the processor, to control the total time that the processor spends in the dormant state. Thus, the processor spends the predetermined percentage of the time in the dormant state, with concomitant guaranteed power savings. The external stimuli and other interrupts occurring during the dormant state may be logged but not serviced (or not serviced completely) during the dormant state invoked by the OS level power limiting task, depending on the relative priorities of the interrupts and the OS level power limiting task. For example, when the processor is awakened by an interrupt from the dormant state invoked by the high priority OS level power limiting task, the operating system may determine that the OS level power limiting task has a higher priority than the interrupt. The operating system would then resume the high priority OS level power limiting task, returning the processor to the dormant state. The interrupt service would then be scheduled by the task scheduler at the beginning of the next time slice. In this way, the processor would remain in the dormant state for a sufficient percentage of time to achieve the power consumption savings necessitated by the power budget of the system.

Figure 6:
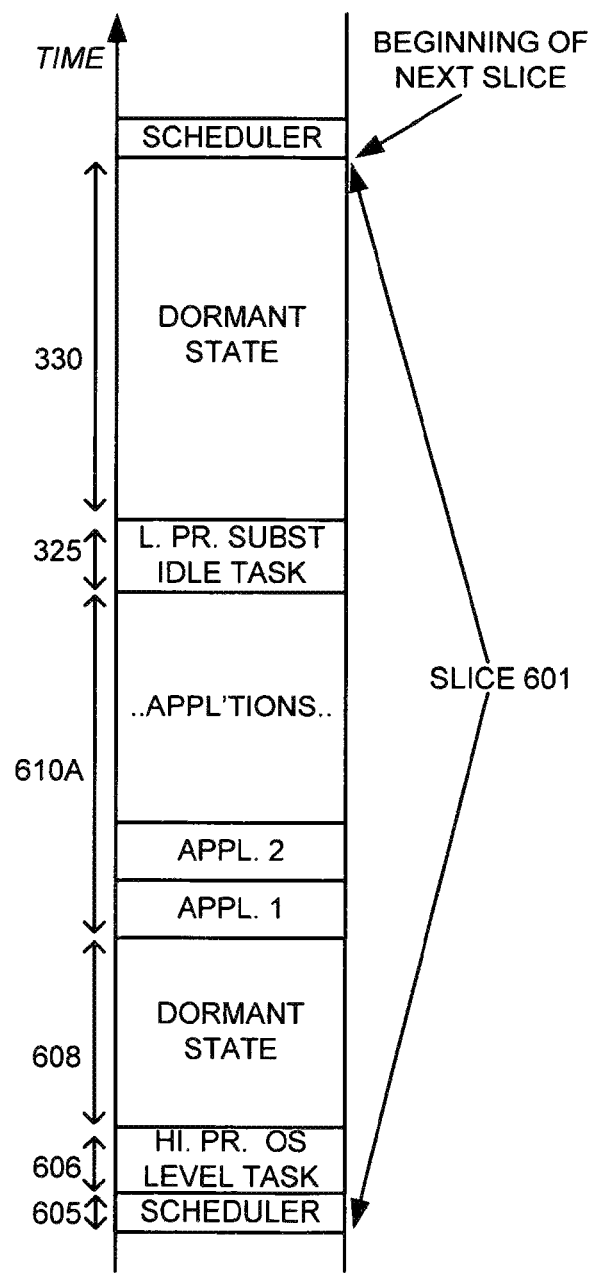
FIG. 6 shows exemplary time periods of processor operation in a modified discretized operating system using low and high priority substitute idle tasks, in accordance with some aspects of the present invention.

Both the high priority OS level power limiting task and the low priority substitute idle task may be combined in the same system. The high priority OS level power limiting task guarantees minimum power savings, while the low priority idle task extends power savings when the computational requirements of the applications do not consume all remaining time of the processor. This is illustrated in FIG. 6, which shows an exemplary sequence of events during a time slice 601.

At the beginning of the time slice 601, a task scheduler is executed in time period 605 to schedule the applications to be executed during this time slice. Because the high priority OS level power limiting task is assigned, by definition, a high priority, it is executed first in time period 606, putting the processor into a dormant state, in time period 608, for a predetermined duration. Thereafter, the processor executes the other scheduled applications, during time period 610. If execution of the scheduled applications is completed before the end of the time slice, as is shown in FIG. 6, the low priority substitute idle task is then executed, in time period 625. The low priority substitute idle task puts the processor into a dormant state, in time period 630, until the next time slice, for example. Note that the dormant state caused by the low priority substitute idle task may be different from the dormant state caused by the high priority OS level power limiting task. The two dormant states may also be the same.

It should be understood that the various computer system elements and process steps described throughout this document can be realized in hardware, firmware, software, or a combination of some or all of the above. It should also be understood that the various method steps performed by one or more processors may be stored in a machine-readable medium, such as a CD, DVD, flash memory, floppy or hard drive, or a similar storage device.

The inventive computer systems and methods for reducing power consumption and heat generation have been described above in considerable detail. This was done for illustration purposes. Neither the specific embodiments of the invention as a whole, nor those of its features, limit the general principles underlying the invention. In particular, the invention is not necessarily limited to the specific processors mentioned. The invention is also not necessarily limited to multi-processor redundant systems. The invention also extends to various dormant states and to modifications of various operating systems. The specific features described herein may be used in some embodiments, but not in others, without departure from the spirit and scope of the invention as set forth. Many additional modifications are intended in the foregoing disclosure, and it will be appreciated by those of ordinary skill in the art that, in some instances, some features of the invention will be employed in the absence of a corresponding use of other features. The illustrative examples therefore do not necessarily define the metes and bounds of the invention and the legal protection afforded the invention, which function is served by the claims and their equivalents.

The invention claimed is:

1. A method of operating a processor, the method comprising:
   executing a task scheduler in a beginning of each of a periodic time slice interval of a plurality of time slice intervals to obtain a determination of scheduled applications and a schedule of application execution during said each said periodic time slice intervals, the plurality of time slice intervals constituting a continuous time period;
   executing the scheduled applications in said each periodic time slice interval in accordance with the determination of scheduled applications and the schedule of application execution during said each periodic time slice interval; and
   executing a substitute idle task upon completion of executing the scheduled applications in said each periodic time slice interval,
   wherein the step of executing the substitute idle task comprises causing the processor to enter a dormant mode.

2. The method in accordance with claim 1, wherein the substitute idle task has an idle task priority that is lower than priority of each of the scheduled applications in said each periodic time slice interval.

3. The method in accordance with claim 1, wherein the substitute idle task has an idle task priority that is no higher than priority of all applications executed by the processor.

4. The method in accordance with claim 1, wherein the step of causing the processor to enter the dormant mode comprises causing the processor to enter a low latency period dormant mode.

5. The method in accordance with claim 1, wherein the step of causing the processor to enter the dormant mode comprises causing the processor to enter a low latency period dormant mode that requires fewer than fifty processor clock cycles to awaken the processor.

6. The method in accordance with claim 1, wherein the step of causing the processor to enter the dormant mode comprises causing the processor to enter a low latency period dormant mode that requires fewer than twenty processor clock cycles to awaken the processor.

7. The method in accordance with claim 1, wherein the step of causing the processor to enter the dormant mode comprises causing the processor to enter a low latency period dormant mode that requires no more than ten processor clock cycles to awaken the processor.

8. The method in accordance with claim 1, further comprising:
receiving a first non-operating system interrupt during the dormant mode caused by the substitute idle task; and
servicing the first non-operating system interrupt during the time slice in which the first non-operating system interrupt is received.

9. The method in accordance with claim 8, wherein the first non-operating system interrupt is generated by a stimulus event external to the computer system of the processor.

10. The method in accordance with claim 8, wherein the first non-operating system interrupt is generated by an event internal to the computer system of the processor.

11. The method in accordance with claim 8, further comprising executing the substitute idle task in response to completion of servicing the first non-operating system interrupt during the time slice in which the first non-operating system interrupt is received.

12. The method in accordance with claim 8, further comprising:
receiving a second non-operating system interrupt during the dormant mode caused by the substitute idle task executed in response to completion of servicing the first non-operating system interrupt; and
servicing the second non-operating system interrupt during the time slice in which the second non-operating system interrupt is received.

13. A method of operating a processor, the method comprising:
executing a task scheduler in a beginning of each periodic time slice interval of a plurality of time slice intervals to obtain a determination of scheduled applications and a schedule of application execution during said each periodic time slice interval,
the schedule of application execution during said each periodic time slice interval being arranged in accordance with priority levels of the scheduled applications for said each periodic time slice interval,
the plurality of time slice intervals constituting a continuous time period,
the scheduled applications comprising a substitute idle task configured to cause the processor to enter a first dormant mode,
the substitute idle task having an idle task priority level lower than each other scheduled application so that the substitute idle task is scheduled last during said each periodic time slice interval; and
executing the scheduled applications in said each periodic time slice interval in accordance with the determination of the scheduled applications and the schedule of application execution during said each periodic time slice interval.

14. The method in accordance with claim 13, wherein the first dormant mode is a low latency period dormant mode that requires fewer than fifty processor clock cycles to awaken the processor.

15. The method in accordance with claim 13, wherein the first dormant mode is a low latency period dormant mode that requires fewer than twenty processor clock cycles to awaken the processor.

16. The method in accordance with claim 13, wherein the first dormant mode is a low latency period dormant mode that requires no more than ten processor clock cycles to awaken the processor.

17. The method in accordance with claim 13, further comprising:
receiving a first non-operating system interrupt during the first dormant mode caused by the substitute idle task; and
servicing the first non-operating system interrupt during the time slice interval in which the first non-operating system interrupt is received.

18. The method in accordance with claim 17, further comprising executing the substitute idle task in response to completion of servicing the first non-operating system interrupt during the time slice interval in which the first non-operating system interrupt is received.

19. The method in accordance with claim 13, wherein the scheduled applications further comprise an OS level power limiting task configured to cause the processor to enter a second dormant mode, the OS level power limiting task having a priority level higher than each other scheduled application so that the OS level power limiting task is scheduled first during said each periodic time slice interval.

20. The method in accordance with claim 19, wherein the first dormant mode is the same as the second dormant mode.

21. The method in accordance with claim 19, wherein the first dormant mode is not the same as the second dormant mode.

22. A computer system comprising:
at least one processor; and
a memory storing program code, the memory being coupled to the at least one processor to allow the at least one processor to read the program code; wherein the program code, when executed by the at least one processor, configures the at least one processor to cause the computer system to
execute a task scheduler in a beginning of each periodic time slice interval, the plurality of time slice intervals to obtain a determination of scheduled applications and a schedule of application execution for said each periodic time slice interval,
the schedule of application execution for said each periodic time slice interval being arranged in accordance with priority levels of the scheduled applications for said each periodic time slice interval, the plurality of time slice intervals constituting a continuous time period, the scheduled applications of said each periodic time slice interval comprising a substitute idle task configured to cause the at least one processor to enter a dormant mode, the substitute idle task having an idle task priority level lower than each other scheduled application so that the substitute idle task is scheduled last during said each periodic time slice interval; and execute the scheduled applications in said each periodic time slice interval in accordance with the determination of the scheduled applications and the schedule of application execution for said each periodic time slice interval.

23. The computer system in accordance with claim 22, wherein the dormant mode is a low latency period dormant mode.

24. The computer system in accordance with claim 22, wherein the dormant mode requires fewer than fifty processor clock cycles to awaken the at least one processor.

25. The computer system in accordance with claim 22, wherein the dormant mode requires fewer than twenty processor clock cycles to awaken the at least one processor.

26. The computer system in accordance with claim 22, wherein the dormant mode requires no more than ten processor clock cycles to awaken the at least one processor.

27. The computer system in accordance with claim 22, wherein the program code, when executed by the at least one processor, further configures the at least one processor to cause the computer system to receive a non-operating system interrupt during the dormant mode caused by the substitute idle task; and service the non-operating system interrupt during the time slice interval in which the non-operating system interrupt is received.

28. The computer system in accordance with claim 27, wherein the program code, when executed by the at least one processor, further causes the processor to cause the computer system to execute the substitute idle task in response to completion of servicing the non-operating system interrupt during the time slice interval in which the non-operating system interrupt is received.

29. The computer system in accordance with claim 22, wherein the at least one processor comprises a plurality of processors and the computer system is a fault-tolerant computer system.

* * * * *

UNITED STATES PATENT AND TRADEMARK OFFICE
CERTIFICATE OF CORRECTION

| | |
|---|---|
| PATENT NO. | : 8,661,446 B2 |
| APPLICATION NO. | : 13/150948 |
| DATED | : February 25, 2014 |
| INVENTOR(S) | : Conrad et al. |

Page 1 of 1

It is certified that error appears in the above-identified patent and that said Letters Patent is hereby corrected as shown below:

In the Specification

In column 1 at line 9, Change "11/1399,001" to --11/399,001--.

Signed and Sealed this
Sixteenth Day of September, 2014

Michelle K. Lee
*Deputy Director of the United States Patent and Trademark Office*